(12) United States Patent
Okazaki

(10) Patent No.: US 11,570,316 B2
(45) Date of Patent: Jan. 31, 2023

(54) IMAGE FORMING APPARATUS AND IMAGE FORMING SYSTEM

(71) Applicant: KYOCERA Document Solutions Inc., Osaka (JP)

(72) Inventor: Yusuke Okazaki, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 17/584,908

(22) Filed: Jan. 26, 2022

(65) Prior Publication Data
US 2022/0247874 A1 Aug. 4, 2022

(30) Foreign Application Priority Data
Jan. 29, 2021 (JP) .............................. JP2021-013014

(51) Int. Cl.
*G06F 3/12* (2006.01)
*H04N 1/00* (2006.01)
(52) U.S. Cl.
CPC ..... *H04N 1/00323* (2013.01); *H04N 1/00408* (2013.01); *H04N 1/00488* (2013.01); *H04N 2201/0094* (2013.01)

(58) Field of Classification Search
CPC .......... H04N 1/00323; H04N 1/00408; H04N 1/00488; H04N 2201/0094
See application file for complete search history.

(56) References Cited

U.S. PATENT DOCUMENTS

| 11,336,789 | B1* | 5/2022 | Miyachi | G06V 40/103 |
| 2019/0089866 | A1* | 3/2019 | Horishita | H04N 1/00251 |
| 2020/0371728 | A1* | 11/2020 | Ogino | H04N 1/00244 |

FOREIGN PATENT DOCUMENTS

JP 2010-197433 A 9/2010

* cited by examiner

*Primary Examiner* — Moustapha Diaby
(74) *Attorney, Agent, or Firm* — Stein IP, LLC

(57) ABSTRACT

An image forming apparatus includes a sensor and an alerting portion. The sensor detects a human. The alerting portion changes the contents of an alert in accordance with the density level of people that is determined based on the number of times of sensing, which is the number of times that a human is detected during a predetermined time based on the output of the sensor, and a predefined threshold value.

10 Claims, 9 Drawing Sheets

IMAGE FORMING APPARATUS AND IMAGE FORMING SYSTEM

INCORPORATION BY REFERENCE

This application is based on and claims the benefit of priority from Japanese Patent Application No. 2021-013014 filed on Jan. 29, 2021, the contents of which are hereby incorporated by reference.

BACKGROUND

The present disclosure relates to an image forming apparatus provided with a sensor for sensing a human around it. The present disclosure also relates to an image forming system including such an image forming apparatus.

Some known image forming apparatuses employ a sensor to sense a human approaching them and use the result of the sensing by the sensor in control.

SUMMARY

According to one aspect of the present disclosure, an image forming apparatus includes a sensor and an alerting portion. The sensor detects a human. The alerting portion changes the contents of an alert in accordance with the density level of people that is determined based on the number of times of sensing, which is the number of times that a human is detected during a predetermined time based on the output of the sensor, and a predefined threshold value.

This and other objects of the present disclosure, and the specific benefits obtained according to the present disclosure, will become apparent from the description of embodiments which follows.

DETAILED DESCRIPTION

An embodiment of the present disclosure will be described below with reference to FIGS. 1 to 8. The following description deals with an image forming system 300 that includes an image forming apparatus and an information processing apparatus 200, and takes a multifunction peripheral 100 as an example of the image forming apparatus. The image forming apparatus may instead be a printer; that is, it is not limited to a multifunction peripheral 100. Any features in terms of structure, arrangement, and the like mentioned in the description of the embodiment are merely illustrative and are in no way meant to limit the scope of the present disclosure.

Today people are required to behave so as not to transmit infectious diseases to others. For example, it is recommended to avoid human crowding and to keep a social distance. In offices too, some measures are needed to prevent infection among the staff members. Known measures include installing a camera to monitor the distances among the staff members, and putting (installing) signs on the floor, desks, or other places in offices to indicate distances. Unfortunately, such measures require extra cost.

In view of the just-mentioned problems with the known measures, the embodiment utilizes a human sensing function of an image forming apparatus to estimate the level of human crowding and issue an alert in accordance with the estimated level.

Figure 1:
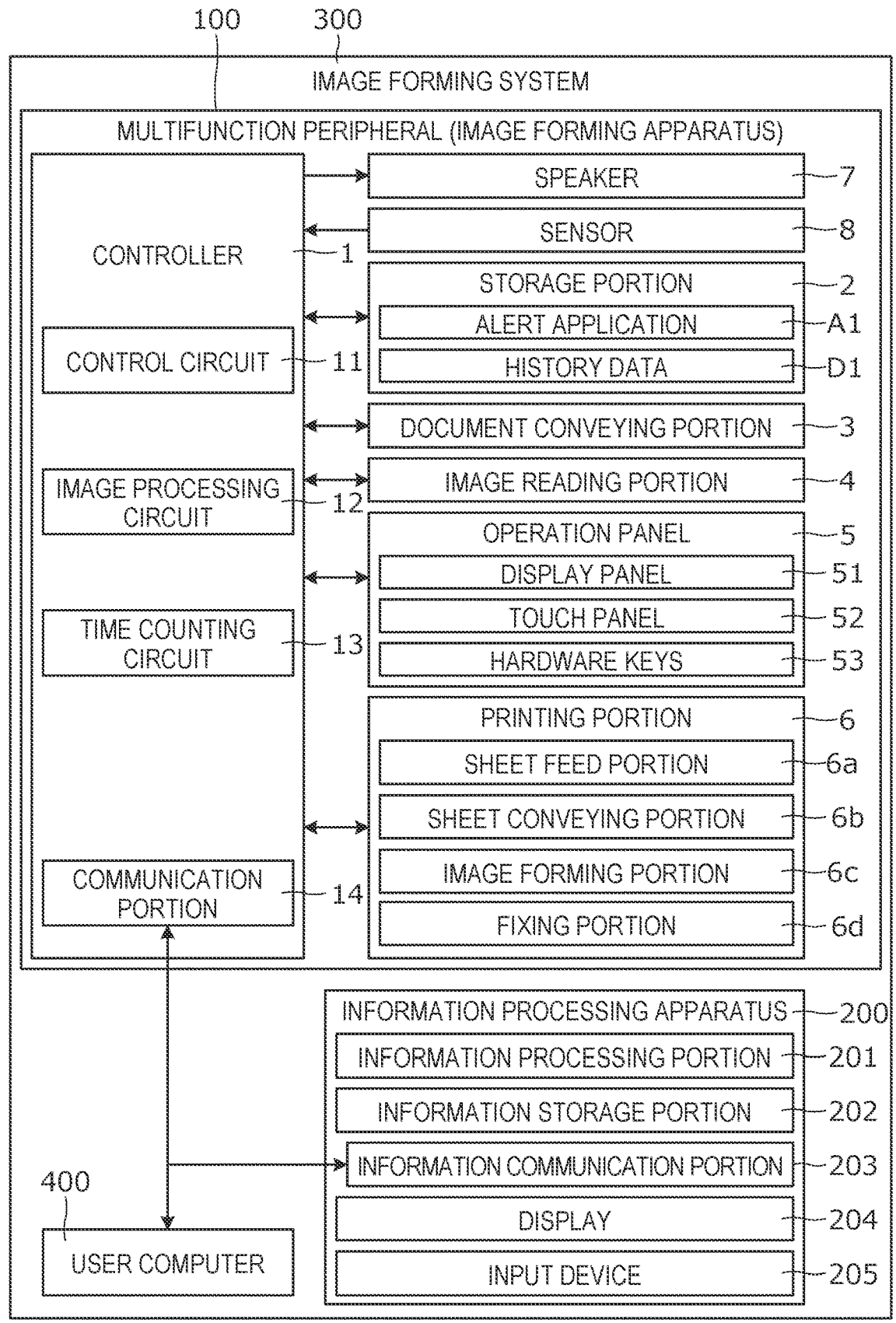
FIG. 1 is a diagram showing one example of a multifunction peripheral and an image forming system according to an embodiment.

1. Image Forming System 300: With reference to FIG. 1, one example of the image forming system 300 according to the embodiment will be described. FIG. 1 is a diagram showing one example of the image forming system 300 according to the embodiment.

The image forming system 300 includes one or more image forming apparatuses (multifunction peripheral 100) and one or more information processing apparatuses 200. The information processing apparatus 200 is a computer such as a PC or a server. The information processing apparatus 200 is, for example, a computer of a manager in an office. The multifunction peripheral 100 and the information processing apparatus 200 are connected together such that they can communicate with each other. For example, the multifunction peripheral 100 and the information processing apparatus 200 are connected to the same local network (in-house LAN). The multifunction peripheral 100 and the information processing apparatus 200 can transmit and receive data to and from each other.

2. Outline of the Multifunction Peripheral 100: Next, with reference to FIG. 1, the multifunction peripheral 100 according to the embodiment will be described in outline. The multifunction peripheral 100 includes a controller 1, a storage portion 2, a document conveying portion 3, an image reading portion 4, an operation panel 5, and a printing portion 6.

The controller 1 is a circuit board that controls the operation of the multifunction peripheral 100. The controller 1 includes, for example, a control circuit 11, an image processing circuit 12, a time counting circuit 13, and a communication portion 14. The control circuit 11 is, for example, a CPU. The control circuit 11 performs various kinds of calculation and processing. The image processing circuit 12 is, for example, a circuit (ASIC) developed for image processing. The image processing circuit 12 performs image processing on image data to generate image data for execution of a job (job execution data). The job execution data is used in a print job or a transmission job. The controller 1 may include a time counting circuit that counts time.

The multifunction peripheral 100 includes, as the storage portion 2, a nonvolatile storage device such as a flash memory and a HDD as well as a RAM. The nonvolatile storage device in the storage portion 2 stores software (programs) and data. Based on the software and data in the storage portion 2, the controller 1 performs calculation and processing to control different parts of the multifunction peripheral 100.

The document conveying portion 3 conveys a document toward a reading position (feed-reading contact glass, not illustrated). In a job involving reading of a document, the controller 1 makes the document conveying portion 3 convey the set document one sheet after another to the reading position. The image reading portion 4 includes, for example, a light source and an image sensor. The image sensor is, for example, a line sensor and includes a plurality of light-receiving elements. Each light-receiving element outputs an analog image signal related to the amount of light reflected. The analog image signal is fed to, for example, the controller 1. Based on the analog image signal, the image processing circuit 12 generates read image data. The controller 1 makes the image reading portion 4 read a document conveyed by the document conveying portion 3 or a document set on a stationary-reading contact glass (not illustrated). The reading yields read image data. Based on the read image data, printing or transmission can be performed.

The operation panel 5 includes a display panel 51, a touch panel 52, and hardware keys 53. The controller 1 controls display on the display panel 51. The controller 1 makes the display panel 51 display, for example, setting screens, various messages, and operation images. The operation images are, for example, buttons, software keys, and tabs. Based on the output of the touch panel 52, the controller 1 recognizes the operated operation images. Based on the signal output from the operated hardware keys 53, the controller 1 recognizes the operated hardware key 53.

The printing portion 6 includes a sheet feed portion 6a, a sheet conveying portion 6b, an image forming portion 6c, and a fixing portion 6d. The sheet feed portion 6a includes, for example, a sheet feed cassette and a sheet feed roller for feeding out sheets. During printing, the controller 1 makes the sheet feed portion 6a feed sheets. The sheet conveying portion 6b includes, for example, a motor and a pair of conveyance rollers. The controller 1 makes the sheet conveying portion 6b convey a sheet fed out from the sheet feed portion 6a. The image forming portion 6c includes, for example, a photosensitive drum, a charging device, an exposure device, a developing device, and a transfer roller. The controller 1 electrostatically charges the photosensitive drum, and has the photosensitive drum exposed to light based on image data by the exposure device. The controller 1 has an electrostatic latent image on the photosensitive drum developed with toner by the developing device. The controller 1 applies a voltage to the transfer roller to have a toner image transferred to a sheet. The fixing portion 6d includes, for example, a heater and a fixing rotary member. The controller 1 makes the fixing portion 6d heat and press the sheet that has the toner image transferred to it. The controller 1 makes the fixing portion 6d fix the toner image.

The controller 1 includes a communication portion 14. The communication portion 14 includes a communication circuit and a communication memory. The communication memory stores communication software. The communication portion 14 can communicate with the information processing apparatus 200 and another computer (user computer 400) across a network. For example, the communication portion 14 receives print job data transmitted from the user computer 400. Based on the print job data, the controller 1 generates image data for job execution (job execution image data). The controller 1 makes the image forming portion 6c perform printing based on the job execution image data.

The multifunction peripheral 100 may include a speaker 7. The controller 1 (control circuit 11) feeds a signal to the speaker 7. Based on the signal fed in, the diaphragm of the speaker 7 vibrates. This produces sound. The controller 1 makes the speaker 7 output (reproduce) sound. For example, the nonvolatile storage device in the storage portion 2 stores the pattern (waveform) of an analog signal. When delivering sound, the controller 1 generates an analog signal with a predetermined pattern and feeds it to the speaker 7.

The multifunction peripheral 100 includes a sensor 8. The sensor 8 senses a human. The sensor 8 is thus a sensor that senses the presence of a human around (near) the multifunction peripheral 100. The sensor 8 is what is often called a human presence sensor. For example, the sensor 8 has a sensing area in front of the multifunction peripheral 100. The output voltage of the sensor 8 is fed to the controller 1 (control circuit 11).

The sensor 8 is, for example, an infrared sensor. The infrared sensor includes, for example, a pyroelectric sensor and a capacitor. The capacitor is charged with the output voltage of the pyroelectric sensor. For example, the voltage charged in the capacitor serves as the output voltage of the sensor 8. In this case, the infrared sensor outputs a voltage related to the amount of infrared radiation received. The infrared radiation receiving surface of the infrared sensor points frontward with respect to the multifunction peripheral 100, and receives infrared radiation within a predetermined range of angles. Irradiation with infrared radiation from a human causes an increase in the output voltage of the sensor 8. The shorter the distance between the sensor 8 and the human is, the higher the output voltage of the sensor 8 tends to be. Based on the output voltage of the sensor 8, the controller 1 judges whether a human is present. If the output voltage of the sensor 8 is equal to or higher than a predefined reference value, the controller 1 (control circuit 11) judges that a human is present. If the output voltage of the sensor 8 is less than a threshold value, the controller 1 judges that no human is present.

The sensor 8 may be a reflective sensor. In that case, the sensor 8 includes a light-emitting element that emits laser light and a light-receiving element that receives the reflected light. The output of the light-receiving element is fed to the controller 1. When the output voltage of the light-receiving element rises from a predetermined value or less to above the predetermined value, the controller 1 (control circuit 11) judges that a human is present. When the output voltage of the light-receiving element falls from above the predetermined value to the predetermined value or less, the controller 1 (control circuit 11) judges that the human is no longer present (has passed by).

The sensor 8 may be a camera. The shooting range of the camera can be in front of the multifunction peripheral 100. The shooting data obtained through the shooting with the camera is fed to the controller 1. The controller 1 may identify the person appearing in the shooting data. The controller 1 may, based on the shooting data, recognize the number of people present around the multifunction peripheral 100. The controller 1 may, based on the shooting data, recognize a person approaching or passing by the multifunction peripheral 100.

3. Information Processing Apparatus 200: Next, with reference to FIG. 1, one example of the information processing apparatus 200 according to the embodiment will be described. The information processing apparatus 200 includes an information processing portion 201, an information storage portion 202, an information communication portion 203, a display 204, and an input device 205. The information processing portion 201 is a circuit board (control circuit board) that includes a control circuit (CPU). The information processing portion 201 performs calculation and processing. The information processing portion 201 controls the operation of the information processing apparatus 200. The information storage portion 202 includes, for example, a RAM, a ROM, and a storage. The storage includes, for example, a HDD or an SSD or both. The nonvolatile storage device in the information storage portion 202 can store data and software.

The display 204 includes, for example, a liquid crystal panel or an organic EL panel. The information processing portion 201 makes the display 204 display screens and information. The input device 205 can be, for example, a keyboard or a mouse or both. The input device 205 accepts operation by the user. Based on the output of the input device 205, the information processing portion 201 recognizes the operation done. The information communication portion 203 includes a communication circuit and a communication memory. The communication memory stores communication software. The information communication portion 203 can communicate with the multifunction peripheral 100 (communication portion 14) across a network.

Figure 2:
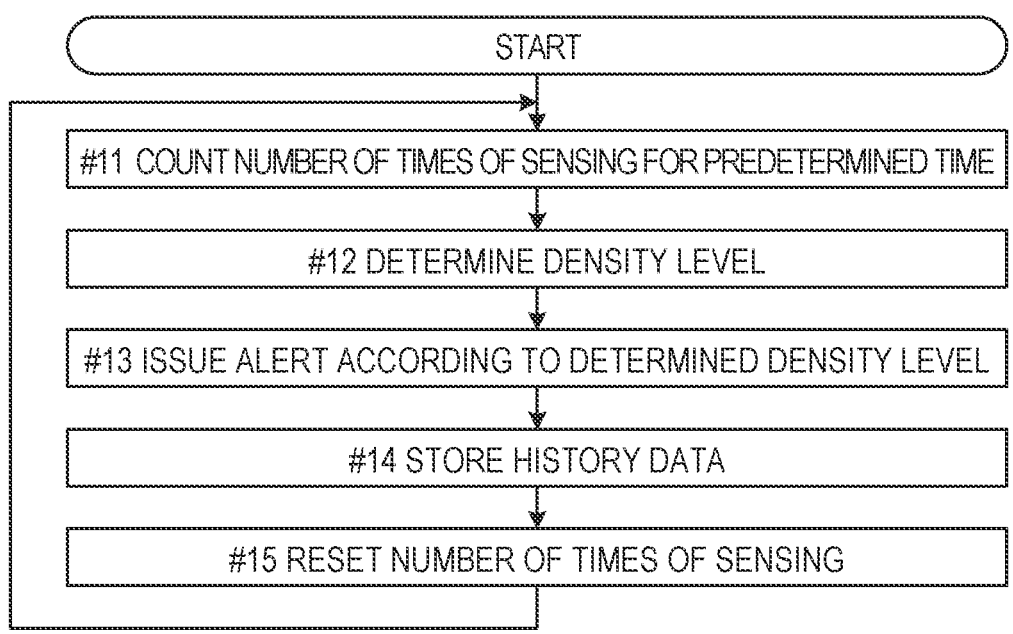
FIG. 2 is a diagram showing one example of the operation for alerting by the multifunction peripheral according to the embodiment.
Figure 3:
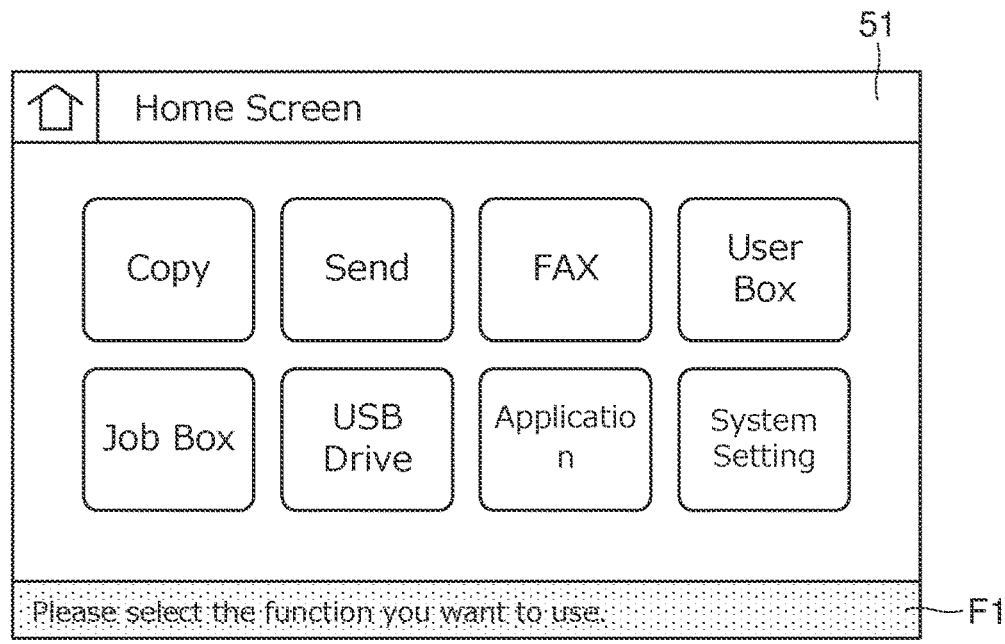
FIG. 3 is a diagram showing one example of a screen displayed on a display panel according to the embodiment.
Figure 4:
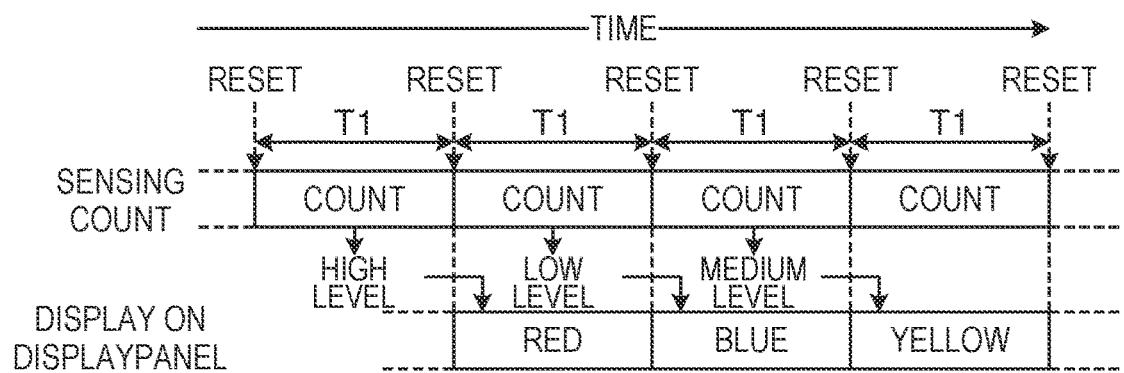
FIG. 4 is a diagram showing one example of alerting according to the embodiment.

4. Alerting by the Multifunction Peripheral 100: Next, with reference to FIGS. 2 and 3, one example of the operation of the multifunction peripheral 100 will be described. FIG. 2 is a diagram showing one example of the operation for alerting by the multifunction peripheral 100 according to the embodiment. FIG. 3 is a diagram showing one example of a screen displayed on the display panel 51 according to the embodiment. FIG. 4 is a diagram showing one example of alerting according to the embodiment.

On the multifunction peripheral 100, an alert mode is available. The alert mode is a mode for estimating the level of human crowding, calculating the density level, and issue an alert in accordance with the estimated level. The multifunction peripheral 100 issues a warning as to human crowding. Using the alert mode requires the alert application A1 to be installed in the storage portion 2 beforehand (see FIG. 1). The alert application A1 has consolidated into it programs for performing various processes (functions) in the alert mode.

Using the alert mode requires the alert application A1 to be activated. For example, the operation panel 5 accepts an operation to start up the alert application A1. When the operation panel 5 accepts an instruction to start up the alert application A1, the controller 1 reads and runs the alert application A1. The controller 1 may, at the start-up of the multifunction peripheral 100 (the turning-on of the main power), start up the alert application A1. The alert mode can be left unused by not activating the alert application A1. For example, the operation panel 5 accepts an operation to end the alert application A1 or keep it inactive.

The procedure in FIG. 2 starts when the alert mode starts being used (when the alert application A1 starts up). First, the controller 1 counts the number of times of sensing for a predetermined time T1 (step #11; see FIG. 4). That is, the controller 1 starts to count the number of times of sensing and continues doing so for the predetermined time T1. The predetermined time T1 is predefined. The predetermined time T1 is, for example, a length of time in the range of five to twenty seconds. The predetermined time T1 is, for example, 10 seconds. The predetermined time T1 may be longer than 20 seconds. The predetermined time T1 may be determined with consideration given to the sensing range and sensing distance of the sensor 8.

The output of the sensor 8 is fed to the controller 1 (control circuit 11). The number of times of sensing is the number of times that, based on the output of the sensor 8, humans are sensed during the predetermined time T1. In other words, the number of times of sensing is the number of times that, based on the output of the sensor 8, the controller 1 senses humans during the predetermined time T1. The control circuit 11 or the time-counting circuit 13 in the controller 1 counts the predetermined time T1.

For example, in a case where the sensor 8 is an infrared sensor, when a human enters the sensing range of the sensor 8, the output voltage value of the sensor 8 exceeds a reference value. As long as the human is present in the sensing range of the sensor 8, the output voltage value of the sensor 8 remains above the reference value. When the human moves away from the multifunction peripheral 100 (when the human moves out of the sensing range), the output voltage value of the sensor 8 falls to the reference value or less. Accordingly, the controller 1 can count as the number of times of sensing the number of times that the output voltage value of the sensor 8 rises from the reference value or less to above the reference value.

In a case where a reflective sensor is used as the sensor 8, the controller 1 can count as the number of times of sensing the number of times that the output voltage of the light-receiving element rises from a predetermined value or less to above the predetermined value. In a case where a camera is used as the sensor 8, the controller 1 can count as the number of times of sensing the number of times that a human newly appears in the shooting data.

When the predetermined time T1 elapses (expires), the controller 1 compares the number of times of sensing with a threshold value and calculates the density level (step #12). The threshold value is predefined. The threshold value is a value for calculation of the density level. A plurality of threshold values may be used, in which case those threshold values are different from each other, and three or more density levels can be distinguished.

Dealt with here is an example where the controller 1 ranks (determines) the density level as one of three levels: a high level, a medium level, and a low level. The number of density levels can be two or more. The number of density levels may be four or more.

Distinguishing three density levels requires two threshold values. The threshold values are different from each other. Let the number of levels be n, then the number of threshold values is (n−1). In the following description, the smaller threshold value is referred to as a first threshold value, and the larger as a second threshold value. For example, if the number of times of sensing is greater than the second threshold value, the controller 1 ranks the density level as the high level; if the number of times of sensing is greater than the first threshold value but equal to or less than the second threshold value, the controller 1 ranks the density level as the medium level; if the number of times of sensing is equal to or less than the first threshold value, the controller 1 ranks the density level as the low level. For example, if the number of times of sensing is five, the first threshold value is three, and the second threshold value is six, the controller 1 ranks the density level as the medium level.

The higher the density of people around the multifunction peripheral 100, the greater the number of times of sensing: put reversely, the lower the density of people around the multifunction peripheral 10, the less the number of times of sensing. The number of times of sensing closely depends on the number of people present in, or passing through, the passage where the multifunction peripheral 100 is installed. Accordingly, based on the number of times of sensing, the controller 1 determines the level of human density around the multifunction peripheral 100.

The controller 1 makes an alerting portion issue an alert in accordance with the determined density level (step #13). The controller 1 may continue the alert in accordance with the determined density level for the subsequent predetermined time T1. The controller 1 can use both the display panel 51 and the speaker 7 as the alerting portion. The controller 1 can use only the display panel 51 as the alerting portion. The controller 1 can use only the speaker 7 as the alerting portion. The controller 1 can accept a choice of which of the display panel 51 and the speaker 7 to use as the alerting portion.

In a case where the display panel 51 is used as the alerting portion, the controller 1 makes the display panel 51 display part or all of the display region in a color corresponding to the density level. If the determined level is high, it is likely that the high human density makes it impossible to keep a social distance. Great caution should be exercised. Red is commonly used as a color to indicate warnings. Accordingly, for example, when the determined level is high, the controller 1 can make the display panel 51 display red. Yellow is frequently used as a color to indicate caution. Accordingly, when the determined level is medium, the controller 1 can make the display panel 51 display yellow. Blue or green is often used as a color to indicate absence of problems. Accordingly, when the determined level is low, the controller 1 can make the display panel 51 display blue or green.

FIG. 3 shows one example of a screen displayed on the display panel 51. The screen in FIG. 3 has in a lower part of it a message display area F1. The message display area F1 is a rectangular strip-like area, with its longitudinal direction aligned with the horizontal direction. The message display area F1 is shown on every display screen. The controller 1 can display the part (pixels) of the message display area F1 other than characters and symbols in a color that corresponds to the determined density level. For example, when the determined density level is high, the controller 1 displays the part of the message display area F1 in red.

The controller 1 can make the display panel 51 display the color corresponding to the density level by blinking it. To convey different density levels by blinking, controller 1 can change the blinking speed for them. As the density level rises, more attention should be attracted from the people around; thus as the determined density level increases, the controller 1 can increase the number of times of blinking per predetermined time T1. For example, if the determined density level is high, the controller 1 can make the display panel 51 blink in red at time intervals of 0.5 seconds; if the determined density level is medium, the controller 1 can make the display panel 51 blink in yellow at time intervals of 1.5 seconds; if the determined density level is low, the controller 1 can make the display panel 51 blink in blue at time intervals of 2.5 seconds.

The controller 1 can display the color corresponding to the density level over the entire display area on the display panel 51. In that case, the controller 1 can continue the full-screen display of the color corresponding to the density level for a predefined period. With a low level, the controller 1 can go without full-screen display. In this way, the controller 1 can change the duration of the full-screen display in accordance with the determined density level.

In a case where the speaker 7 is used as the alerting portion, the controller 1 can make the speaker 7 deliver sound in accordance with the density level. A high density of people should be conveyed effectively with sound. To that end, for example, as the determined density level increases, the controller 1 can increase the sound volume of the alert sound. For example, the controller 1 can change the sound volume of a buzzer in accordance with the determined density level. If the determined density level is the lowest, the controller 1 can go without delivering sound. As the determined density level increases, the controller 1 can raise the frequency of the alert sound. Or, as the determined density level increases, the controller 1 can lower the frequency of the alert sound.

The controller 1 then resets the number of times of sensing (step #14). Specifically, the controller 1 sets the number of times of sensing to zero. The controller 1 also makes the nonvolatile storage device in the storage portion 2 store history data D1 (step #15; see FIG. 1). The history data D1 is data that records a history of the density level. For example, the history data D1 is data that comprises combinations of a newly determined density level with the date and time that it was determined. Referring to the history data D1, it is possible to grasp a time zone and a day of week when the density of people tends to be high.

The controller 1 then executes step #11 (returns to step #11). Back at step #11, until the predetermined time T1 elapses (i.e., for the current predetermined time T1), the controller 1 makes the alerting portion issue the alert that corresponds to the density level determined based on the number of times of sensing during the previous predetermined time T1. If, back at step #12, the determined density level changes, the controller 1 makes the alerting portion change the contents of the alert.

The procedure in FIG. 2 can be continued until the alert application A1 stops or the power to the multifunction peripheral 100 is turned off. In a power-saving mode, the procedure in FIG. 2 can be interrupted. The controller 1 can perform the procedure in FIG. 2 only in a predefined time zone. The operation panel 5 can accept a time zone in which to perform the procedure in FIG. 2.

FIG. 4 is a diagram showing one example of alerting on the display panel 51. As shown in FIG. 4, the controller 1 counts the number of times of sensing every predetermined time T1. Based on the number of times of sensing and the threshold values, the controller 1 determines the density level. FIG. 4 shows an example of how the controller 1 makes the display panel 51 display colors in accordance with the density level.

Installation Site-Adapted Threshold Values: Next, with reference to FIGS. 5A, 5B, 5C. 5D, and 6, a description will be given of one example of how the threshold values are set to suit the installation site on the multifunction peripheral 100 according to the embodiment. FIGS. 5A, 5B, 5C, and 5D are diagrams each showing an example of how the multifunction peripheral 100 according to the embodiment is installed. FIG. 6 is a diagram showing one example of a setting screen according to the embodiment.

The multifunction peripheral 100 is installed in an office, at a site convenient to users. It can be installed, for example, in a vacant space or at a site easily accessible to many people, it may be installed near an electric outlet. The multifunction peripheral 100 can be installed at varying sites.

Figure 5A:
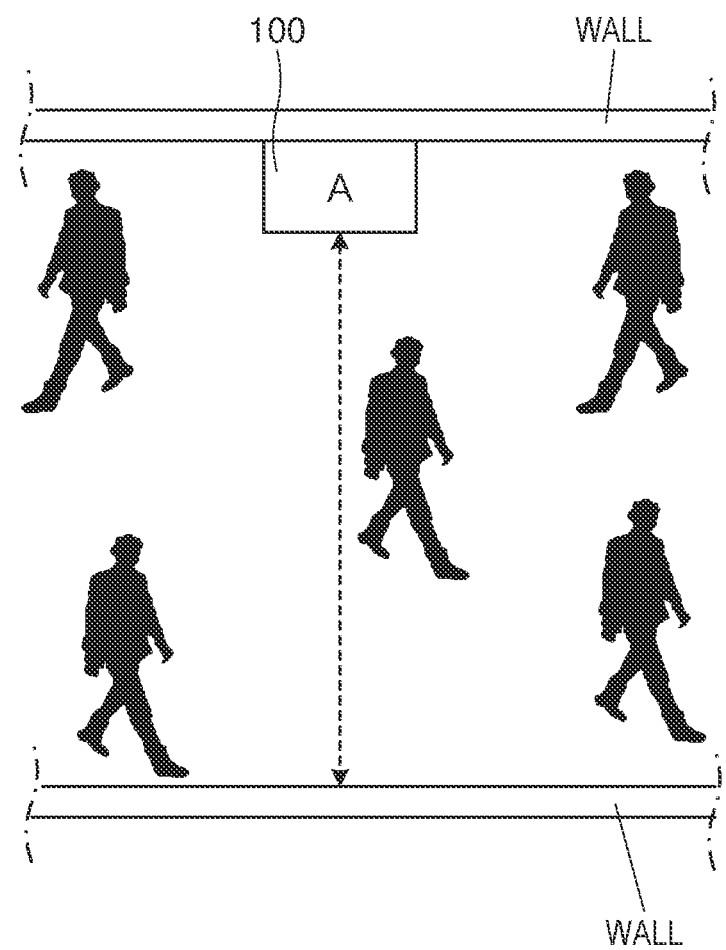
FIGS. 5A, 5B, 5C, and 5D are diagrams each showing an example of how the multifunction peripheral according to the embodiment is installed.
Figure 5B:
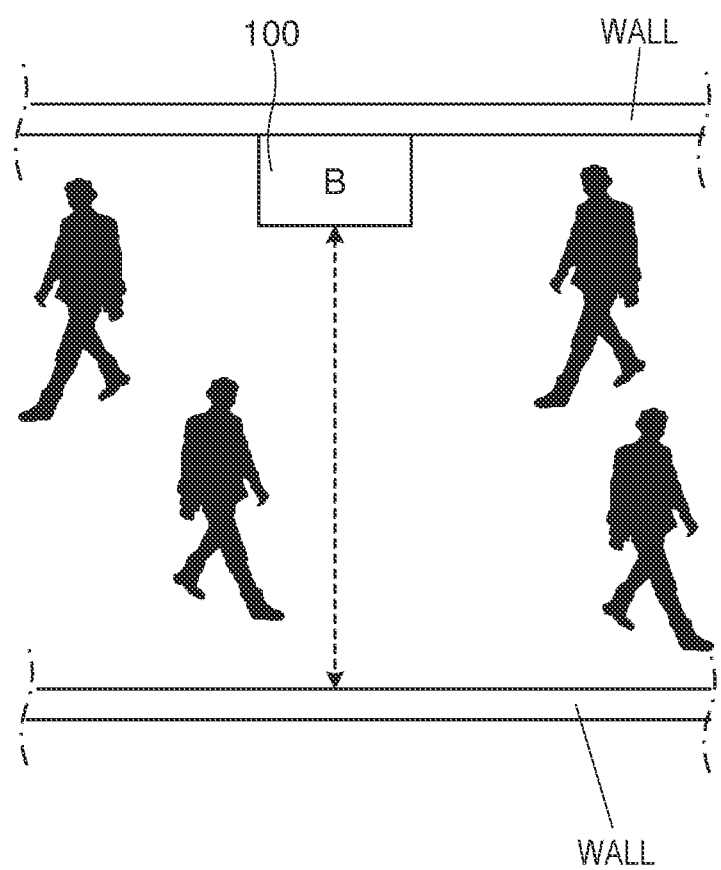
Figure 5C:
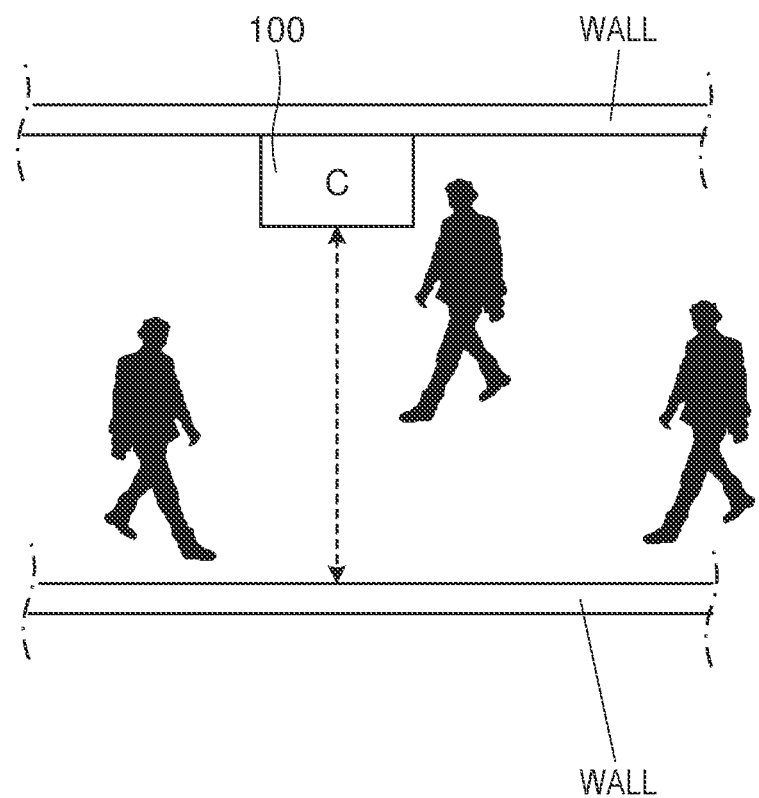
Figure 5D:
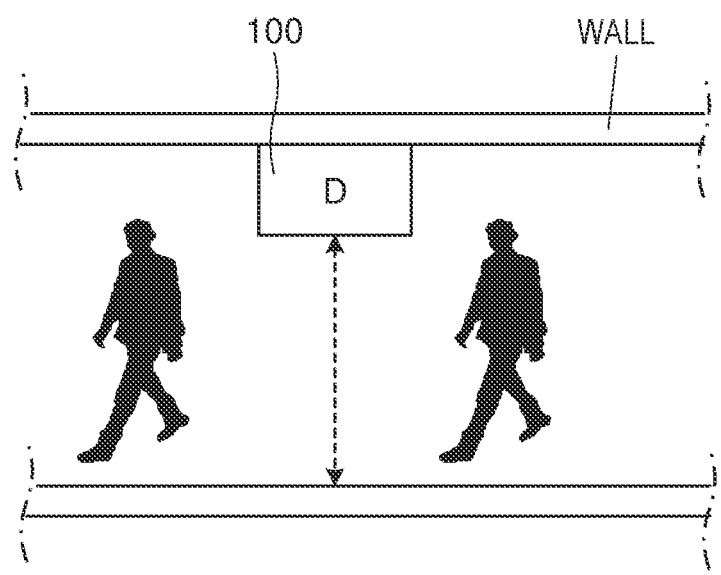
Figure 6:
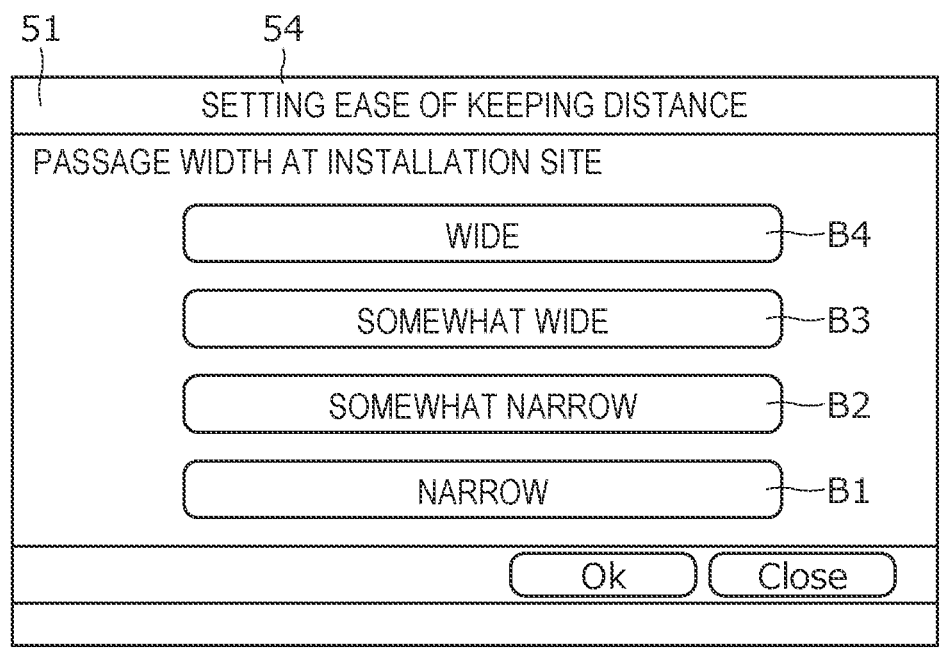
FIG. 6 is a diagram showing one example of a setting screen according to the embodiment.

In FIGS. 5A, 5B. 5C, and 5D, a rectangular box enclosing an alphabetical letter ("A", "B", "C", or "D") represents the multifunction peripheral 100. FIGS. 5A, 5B, 5C, and 5D show the multifunction peripheral 100 installed at sites with different passage widths (indicated by broken line arrows) such that (passage width in FIG. 5A)>(passage width in FIG. 5B)>(passage width in FIG. 5C)>(passage width in FIG. 5D). As at A, the multifunction peripheral 100 can be installed in the widest passage in the office. As at D, the multifunction peripheral 100 can be installed in a comparatively narrow passage.

Suppose the number of people around the multifunction peripheral 100 is equal. Then the wider the passage, the lower the density of people, the narrower the passage, the higher the density of people. Suppose there are four people around the multifunction peripheral 100, the density of people around the multifunction peripheral 100 is increasingly high in the order FIG. 5D, FIG. 5C, FIG. 5B, and FIG. 5A. In this way, even with the number of times of sensing equal, as the area of the passage (passage width) at the installation site of the multifunction peripheral 100 varies, the ease of keeping a distance between people and the density of people vary.

With what has just been discussed taken into consideration, the multifunction peripheral 100 permits a setting to be made as to the ease of keeping a distance between people at the installation site of the multifunction peripheral 100. The operation panel 5 accepts entry of a setting as to the ease of keeping a distance between people at the installation site of the apparatus body. When a predetermined operation is done, the controller 1 makes the display panel 51 display a passage width setting screen 54 for determining the ease of keeping a distance. As shown in FIG. 6, the controller 1 can make the display panel 51 display, as buttons for choosing the ease of keeping a distance between people, selection buttons for selecting the width of the passage at the installation site. FIG. 6 shows an example where four selection buttons are shown, namely a first selection button B1 labeled "narrow", a second selection button B2 labeled "somewhat narrow", a third selection button B3 labeled "somewhat wide", and a fourth selection button B4 labeled "wide". To make a setting, a user can operate one of the four selection buttons.

For example, if the passage width at the installation site of the multifunction peripheral 100 is less than 1 m, the first selection button B1 is operated: if the passage width at the installation site of the multifunction peripheral 100 is equal to or more than 1 m but less than 1.5 m, the second selection button B2 is operated; if the passage width at the installation site of the multifunction peripheral 100 is equal to or more than 1.5 m but less than 2 m, the third selection button B3 is operated; if the passage width at the installation site of the multifunction peripheral 100 is equal to or more than 2 m, the fourth selection button B4 is operated.

While the above description with reference to FIG. 6 deals with an example where, to choose the ease of keeping a distance between people, buttons for selecting the passage width are operated, the operation panel 5 may instead display a plurality of buttons for selecting the area of the space around the multifunction peripheral 100.

In accordance with the set level of ease of keeping a distance (the operated button), the controller 1 changes the threshold values. Specifically, the lower the set level of ease of keeping a distance is, the smaller the controller 1 makes the threshold values; the higher the set level of ease of keeping a distance is, the greater the controller 1 makes the threshold values. Thus, on a multifunction peripheral 100 installed in a narrow passage, the determined density level tends to be higher than on a multifunction peripheral 100 installed in a wide passage.

Specifically, in a case where the density level is ranked as one of three levels, i.e., high, medium, and low levels, based on the first and second threshold values, as the set level of ease of keeping a distance decreases, the controller 1 reduces the first and second threshold values. That is, in a case where the density level is determined with reference to a plurality of threshold values, as the set level of ease of keeping a distance decreases, the controller 1 reduces those threshold values.

In a case where the density level is determined with reference to a plurality of threshold values, in accordance with the set level of ease of keeping a distance, the controller 1 can change only part of the threshold values. For example, in accordance with the set level of ease of keeping a distance, the controller 1 can change only the threshold value for checking whether the density level is the highest.

The controller 1 makes the storage portion 2 store the threshold values that correspond to the set level of ease of keeping a distance (the passage width). When the setting for the level of ease of keeping a distance is changed, the controller 1 makes the storage portion 2 store anew the threshold values that correspond to the level of ease of keeping a distance after the change.

Figure 7:
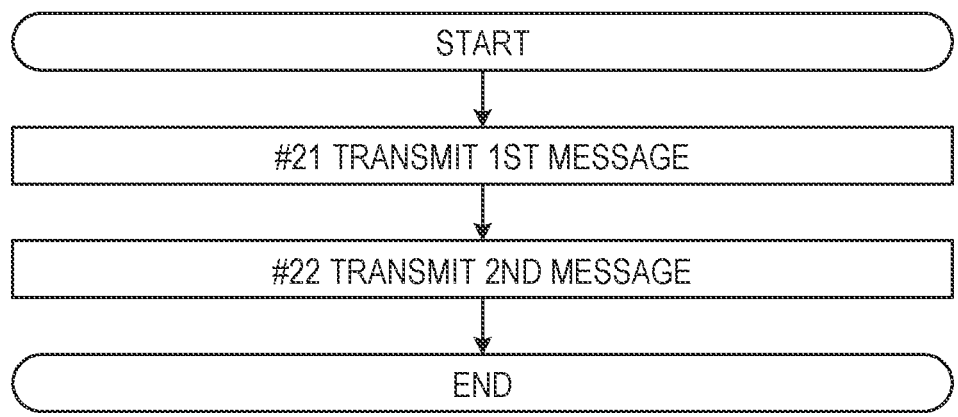
FIG. 7 is a diagram showing one example of the operation for message transmission by the multifunction peripheral according to the embodiment.

6. Transmitting a Message: Next, with reference to FIG. 7, a description will be given of one example of message transmission by the multifunction peripheral 100 according to the embodiment. FIG. 7 is a diagram showing one example of the operation for message transmission by the multifunction peripheral 100 according to the embodiment.

If the determined density level is high, it is likely that the density of people around the multifunction peripheral 100 is high. When the determined density level is high, the multifunction peripheral 100 transmits a message discouraging people from approaching the multifunction peripheral 100. It is thus possible to prevent human crowding and to keep a social distance.

The procedure in FIG. 7 starts when the determined density level is equal to or higher than a predefined alert level. Here, the alert level is predefined. For example, when three levels—high, medium, and low—are distinguished, the alert level may be the high level, or may be the medium level. The alert level should preferably be at least a level higher than the lowest density level. The operation panel 5 may accept a setting for a level to serve as the alert level.

First, the controller 1 makes the communication portion 14 transmit to the computer (user computer 400) of the person who demanded printing a message (first message) discouraging from coming to retrieve the printed result (step #21). The user computer 400 displays the received first message on the display 204. This prevents the person from approaching the multifunction peripheral 100 and hence prevents a rise in the density of people around the multifunction peripheral 100.

As mentioned earlier, on receiving print job data, the multifunction peripheral 100 performs the print job. Accordingly, the controller 1 can make the communication portion 14 transmit the first message to the user computer 400 that has transmitted the print job data for the print job that is being performed. The controller 1 can make the communication portion 14 transmit the first message to the user computer 400 that has transmitted the print job data for the print job that is waiting to be performed. The controller 1 can make the communication portion 14 transmit the first message to the user computer 400 that is to transmit print job data within a predetermined time of the current time. If no print job is being performed, or if no print job is waiting to be performed, or if no user computer 400 is to transmit print job data within a predetermined time of the current time, the controller 1 may go without transmitting the first message.

The controller 1 makes the communication portion 14 transmit a message (second message) discouraging people from using the image forming apparatus (multifunction peripheral 100) (step #22 to END). The user computer 400 displays the received second message on the display 204. A user intending to transmit print job data or a user intending to use the image forming apparatus can be warned against doing that. Such users can be encouraged to defer the use of anything around the image forming apparatus.

For example, the controller 1 can make the communication portion 14 transmit the second message to the user computer 400 that is connected to a local network and to which the first message is not transmitted. The controller 1 can make the communication portion 14 transmit the second message to the user computer 400 of a person who is registered as a user in the multifunction peripheral 100. The storage portion 2 may store the address of the user computer 400 to which to transmit the second message. The controller 1 can make the communication portion 14 transmit the second message to the address stored in the storage portion 2.

Frequent display of the first or second message may annoy the user. To avoid that, the controller 1 may go without transmitting the first message until a predetermined wait time has passed after the previous transmission of the first message. Likewise, the controller 1 may go without transmitting the second message until a predetermined wait time has passed after the previous transmission of the second message.

Figure 8:
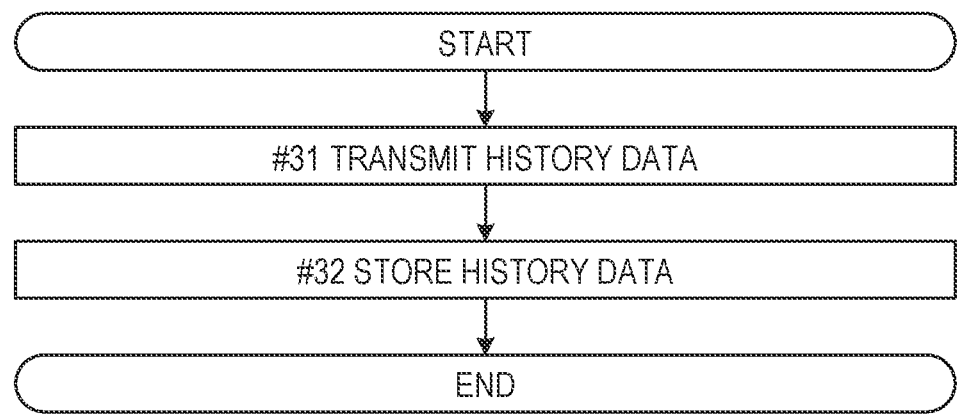
FIG. 8 is a diagram showing one example of transmission and collection of history data according to the embodiment.

7. Transmitting and Collecting History Data D1: Next, with reference to FIG. 8, a description will be given of one example of transmission and collection of history data D1 according to the embodiment. FIG. 8 is a diagram showing one example of transmission and collection of history data D1 according to the embodiment.

The information processing apparatus 200 collects history data D1 periodically and continuously from the multifunction peripheral 100. The procedure in FIG. 8 starts when a time to transmit history data D1 arrives. The controller 1 makes the communication portion 14 transmit history data D1 to the information processing apparatus 200 (information communication portion 203) (step #31).

The time to transmit history data D1 is predefined. The operation panel 5 accepts a setting for the time to transmit history data D1. The transmission can be set to take place, for example, on a predetermined day of week, at a predetermined time of day. The history data D1 can be transmitted at time intervals shorter or longer than one week. The history data D1 can be transmitted, for example, every hour, every several hours, every day, or every several days.

The information processing apparatus 200 (information processing portion 201) makes the nonvolatile storage device in the information storage portion 202 store the received history data D1 (step #32 to END). With the information storage portion 202 storing and referring to the received history data D1, it is possible to find out a day of weak and a time zone prone to a high density of people.

A plurality of image forming apparatuses may be installed in an office. Accordingly, the information processing apparatus 200 may collect history data D1 from a plurality of image forming apparatuses. It is then possible to refer to the history data D1 of those image forming apparatuses on the information processing apparatus 200. For each of different sites in an office, it is possible to find out a day of weak and a time zone prone to a high density of people. Referring to the history data D1 may lead to a grasp of a department prone to a high density of people.

As described above, an image forming apparatus (multifunction peripheral 100) according to the embodiment includes a sensor 8 and an alerting portion (a display panel 51 and/or a speaker 7). The sensor 8 senses a human. In accordance with the level of human density calculated based on the number of times of sensing, which is the number of times that a human is sensed during a predetermined time T1 based on the output of the sensor 8, and predefined threshold values, the alerting portion changes the contents of the alert.

With the sensor 8 (human presence sensor), which senses humans, it is possible to estimate the level of human crowding (density level). More specifically, based on the number of people passing through the passage in which the image forming apparatus is installed, it is possible to determine whether there is a crowded condition around the image forming apparatus and in the passage where it is installed. The image forming apparatus can then issue an alert in accordance with the estimated level to alleviate human crowding. That is, an alert adequate to the density level is issued. It is thus possible to make people around the image forming apparatus recognize the high density of people (a crowded condition), and to prompt them to alleviate the crowded condition. This leads to people keeping longer distances from each other and to keep a social distance. The image forming apparatus is used effectively to fend off infectious diseases and to keep a social distance. There is no need to install a special camera or to adapt the floor or desks for that purpose. It is possible to estimate the level of human crowding with no extra cost.

The alerting portion is a display panel 51 or a speaker 7 or both. The display panel 51 displays part or the whole of the display area in a color that corresponds to the density level. The speaker 7 delivers sound that corresponds to the density level. With display or sound or both, the density level can be indicated. By sight or hearing, the density level sensed by the image forming apparatus can be recognized.

The display panel 51 may blink the color displayed in accordance with the density level. As the density level is higher, the display panel 51 can increase the number of times of blinking per predetermined time T1. With the number of times of blinking, the density level can be indicated. This gives an easier grasp of the current density level.

The image forming apparatus (multifunction peripheral 100) includes a controller 1 that counts the number of times of sensing based on the output of the sensor 8 and that compares the number of times of sensing with a threshold value to determine the density level. With the controller 1 (control circuit 11) calculating, the density level can be determined based on comparison with the threshold value.

The controller 1 may reset the number of times of sensing every predetermined time T1. During the current predetermined time T1, the controller 1 can make the alerting portion issue an alert that corresponds to the density level determined based on the number of times of sensing during the predetermined time T1 immediately before the resetting. The density level can be determined every predetermined time T1, that is, periodically. It is thus possible to issue, while the number of times of sensing is being counted, an alert based on the sensing result during the previous (last) predetermined time T1. It is possible to issue an alert on a real-time basis to reflect the traffic of people and the variation of their density.

The image forming apparatus (multifunction peripheral 100) includes an operation panel 5 that accepts a setting of a level of ease of keeping a distance between people at the site where the apparatus body is installed. The controller 1 can change the threshold values in accordance with the set level of ease of keeping a distance. A large space around the image forming apparatus is unlikely to lead to a crowded condition. For example, if the passage in which the image forming apparatus is installed is narrow and the space around the image forming apparatus is small, even a small number of people may cause a crowded condition. It is possible to set a level of ease of keeping a distance between people at the installation site of the image forming apparatus. For example, when making a setting, one can determine the level of ease of keeping a distance based on the width of the passage where the image forming apparatus is installed. It is possible to change the threshold values in accordance with the installation site of the image forming apparatus. It is possible to set the level of ease of keeping a distance at the installation site, and to set threshold values in accordance with the passage width.

As the set level of ease of keeping a distance decreases, the controller 1 can decrease the threshold values. In a small space or in a passage with a narrow width, people tend to come close to each other. Accordingly, as the set level of ease of keeping a distance decreases, the threshold values are decreased. This results in higher sensitivity and tends to make the determined density level higher. It is possible to issue an alert that suits the width of the passage where the image forming apparatus is installed.

The image forming apparatus (multifunction peripheral 100) includes a storage portion 2 that stores history data D1 that records a history of the density level. The history data D1 is data that records the determined density level along with the date and time that it was determined. It is possible to keep a history of density levels determined. By referring to and analyzing the history data D1, it is possible to grasp a time zone, a day of weak, and a department prone to a crowded condition.

The image forming apparatus (multifunction peripheral 100) includes a communication portion 14 (communication circuit) that communicates with an external device. The communication portion 14 transmits the history data D1 to a predetermined transmission destination. The history data D1 can be collected on the information processing apparatus 200. By collecting the history data D1 from a plurality of image forming apparatuses, it is possible to find out, in an office, a site that is prone to human crowding and a site where a social distance is difficult to keep.

If the determined density level is equal to or higher than a predefined alert level, the communication portion 14 can transmit to the computer of the person who performed the printing a message (first message) discouraging him or her from coming to retrieve the printed result. Advising not to come to retrieve the printed result helps prevent an increase in the human density around the image forming apparatus. It thus helps keep a social distance.

If the determined density level is equal to or higher than a predefined alert level, the communication portion 14 can transmit a message (second message) discouraging people from using the image forming apparatus. When a user wants to perform copying or transmission, he or she approaches the image forming apparatus. After a user has the image forming apparatus perform a print job, he or she comes to it to retrieve the printed result. This may leads to a higher human density and a shorter distance between people. To prevent that, a message is indicated not to come to the image forming apparatus to retrieve the printed result. People can be warned not to approach the site with a high human density. It is possible to prevent an increase in human density around the image forming apparatus. It is thus possible to keep a social distance.

An image forming system 300 includes an image forming apparatus (multifunction peripheral 100) as described above and an information processing apparatus 200 that receives the history data D1 transmitted from the image forming apparatus. The information processing apparatus 200 can collect the history data D1 from a plurality of image forming apparatuses. By evaluating and analyzing the history data D1 of a plurality of image forming apparatuses, it is possible to find out, in an office, a site that is prone to a high human density and a site where a social distance is difficult to keep.

While an embodiment of the present disclosure has been described, it is not meant to limit the scope of the present disclosure, which thus allows for various modifications without departure from the spirit of the present disclosure.

According to the present disclosure, it is possible to utilizes a human sensing function of an image forming apparatus to estimate the level of human crowding: it is possible to issue an alert in accordance with the estimated level to alleviate human crowding; it is possible to effectively use the image forming apparatus to keep a social distance.

The present disclosure is applicable to image forming apparatuses that communicate with a portable storage device connected to them.

What is claimed is:

1. An image forming apparatus comprising:
   a sensor that detects a human;
   an alerting portion that changes contents of an alert in accordance with a density level of people determined based on
      a number of times of sensing, which is a number of times that a human is detected during a predetermined time based on an output of the sensor, and
      a predefined threshold value,
   wherein
   the alerting portion is a display panel or a speaker or both,
   the display panel displays part or a whole of a display region in a color that corresponds to the density level,
   the speaker delivers sound that corresponds to the density level,
   the display panel blinks the displayed color in accordance with the density level and
   as the density level increases, the display panel increases a number of times of blinking during the predetermined time.

2. The image forming apparatus according to claim 1, further comprising:
   a controller that counts the number of times of sensing based on the output of the sensor and compares the number of times of sensing with the threshold value to determine the density level.

3. The image forming apparatus according to claim 2, further comprising:
   an operation panel that accepts a setting of a level of ease of keeping a distance between people at a site where an apparatus body is installed,
   wherein
   in accordance with the set level of ease of keeping a distance, the controller changes the threshold value.

4. The image forming apparatus according to claim 3, wherein
   as the set level of ease of keeping a distance decreases, the controller reduces the threshold value.

5. The image forming apparatus according to claim 1, further comprising:
   a storage portion that stores history data that records a history of the density level,
   wherein the history data is data that records the determined density level along with a data and time that the density level was determined.

6. The image forming apparatus according to claim 5, further comprising:
a communication portion that communicates with an external device,
wherein
the communication portion transmits the history data to a predetermined transmission destination.

7. An image forming system comprising:
the image forming apparatus according to claim 5; and
an information processing apparatus that receives the history data transmitted from the image forming apparatus.

8. The image forming apparatus according to claim 1, further comprising:
a communication portion that communicates with an external device,
wherein
if the determined density level is equal to or higher than a predefined alert level, the communication portion transmits a message encouraging deferring use of the image forming apparatus.

9. An image forming apparatus comprising:
a sensor that detects a human:
an alerting portion that changes contents of an alert in accordance with a density level of people determined based on
a number of times of sensing, which is a number of times that a human is detected during a predetermined time based on an output of the sensor, and
a predefined threshold value: and
a controller that counts the number of times of sensing based on the output of the sensor and compares the number of times of sensing with the threshold value to determine the density level.
wherein
the controller resets the number of times of sensing every time the predetermined time passes, and
in the current predetermined time, the controller makes the alerting portion issue an alert in accordance with the density level determined based on the number of times of sensing during the previous predetermined time.

10. An image forming apparatus comprising:
a sensor that detects a human:
an alerting portion that changes contents of an alert in accordance with a density level of people determined based on
a number of times of sensing, which is a number of times that a human is detected during a predetermined time based on an output of the sensor, and
a predefined threshold value: and
a communication portion that communicates with an external device,
wherein
if the determined density level is equal to or higher than a predefined alert level, the communication portion transmits to a computer of a person who performed printing a message discouraging coming to retrieve a printed result.

\* \* \* \* \*